US011878519B2

(12) United States Patent
Park

(10) Patent No.: US 11,878,519 B2
(45) Date of Patent: Jan. 23, 2024

(54) PRINTING APPARATUS AND PRINTING METHOD

(71) Applicant: SEMES CO., LTD., Chungcheongnam-do (KR)

(72) Inventor: Sang Hoon Park, Seoul (KR)

(73) Assignee: SEMES CO., LTD., Cheonan-si (KR)

( * ) Notice: Subject to any disclaimer, the term of this patent is extended or adjusted under 35 U.S.C. 154(b) by 36 days.

(21) Appl. No.: 17/742,397

(22) Filed: May 12, 2022

(65) Prior Publication Data

US 2022/0266592 A1 Aug. 25, 2022

(30) Foreign Application Priority Data

Jun. 29, 2021 (KR) ........................ 10-2021-0084835

(51) Int. Cl.
*B41J 2/045* (2006.01)
*B41J 11/00* (2006.01)

(52) U.S. Cl.
CPC ....... *B41J 2/04556* (2013.01); *B41J 11/0095* (2013.01); *B41J 2203/01* (2020.08)

(58) Field of Classification Search
CPC .. B41J 2/04556; B41J 2203/01; B41J 25/308; B41J 25/304; B41J 3/4073; B41J 29/38
See application file for complete search history.

(56) References Cited

U.S. PATENT DOCUMENTS

2016/0368292 A1* 12/2016 Kurosawa ............ B41J 25/3082
2018/0229497 A1 8/2018 Darrow et al.

FOREIGN PATENT DOCUMENTS

| | | |
|---|---|---|
| CN | 108001051 A * | 5/2018 |
| JP | 2005-138013 | 6/2005 |
| KR | 10-2006-0061934 | 6/2006 |
| KR | 10-0719773 | 5/2007 |
| KR | 10-2010-0122765 | 11/2010 |
| KR | 10-2012-0031872 | 4/2012 |
| KR | 10-1318212 | 10/2013 |
| KR | 10-2020-0138842 | 12/2020 |

OTHER PUBLICATIONS

Liang, Machine TranslationofCN-108001051-A, 2018 (Year: 2018).*
Notice of Allowance dated Aug. 7, 2023 for Korean Patent Application No. 10-2021-0084835 and its English translation from Global Dossier.

* cited by examiner

*Primary Examiner* — Scott A Richmond
(74) *Attorney, Agent, or Firm* — Ladas & Parry, LLP

(57) ABSTRACT

Provided is a printing apparatus. The printing apparatus includes: a stage on which an object is positioned; a printing unit provided above the stage and performing printing on the object; and a control part configured to perform a correction for printing on at least one of the object, the stage, and the printing unit based on preset printing conditions, in which the printing unit includes a head frame provided above the stage, a detection sensor configured to detect a distance between the head frame and a part positioned thereunder, and a heat part provided on the head frame to perform printing on the object.

15 Claims, 6 Drawing Sheets

[FIG. 1]
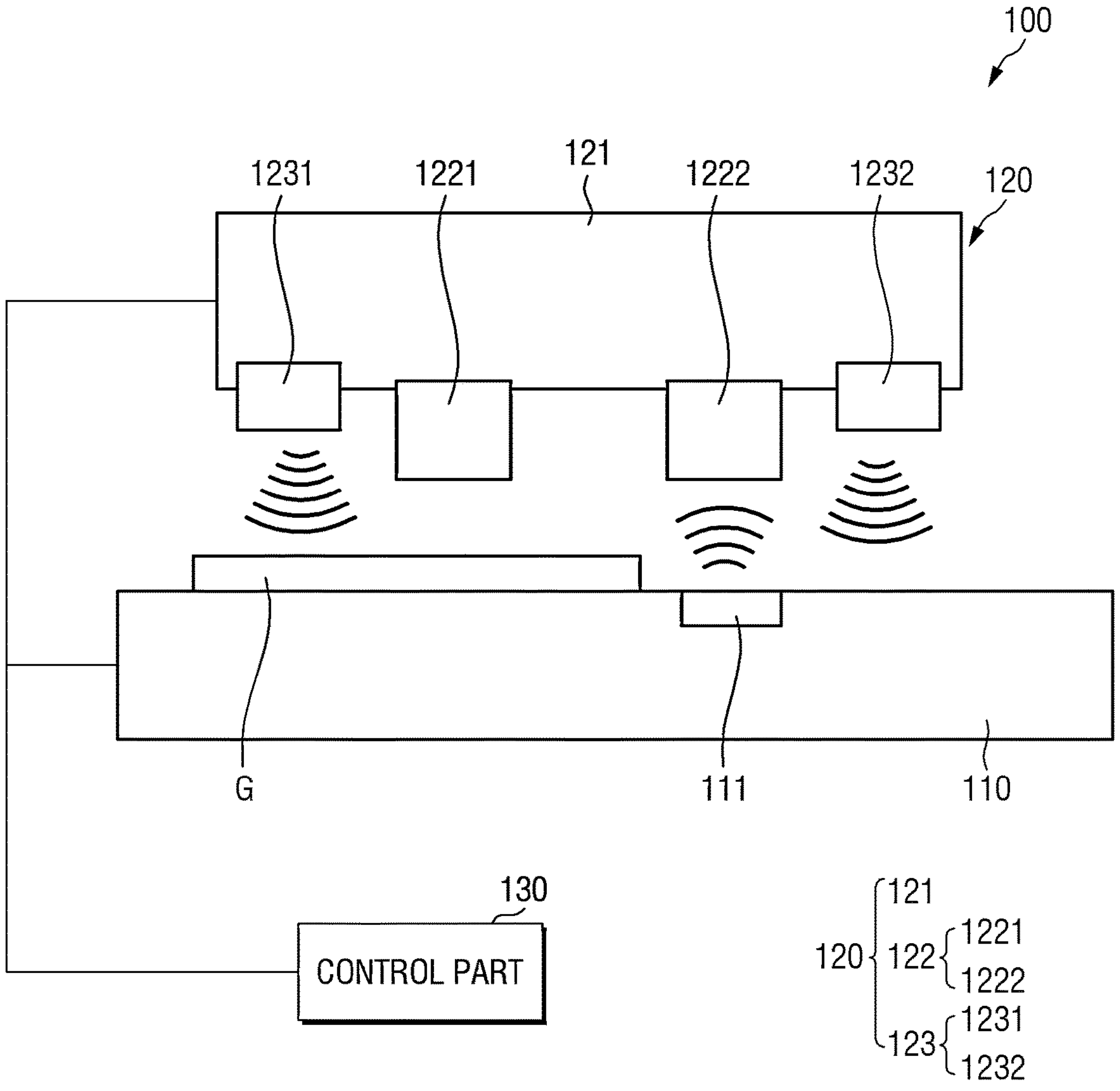

[FIG. 2]
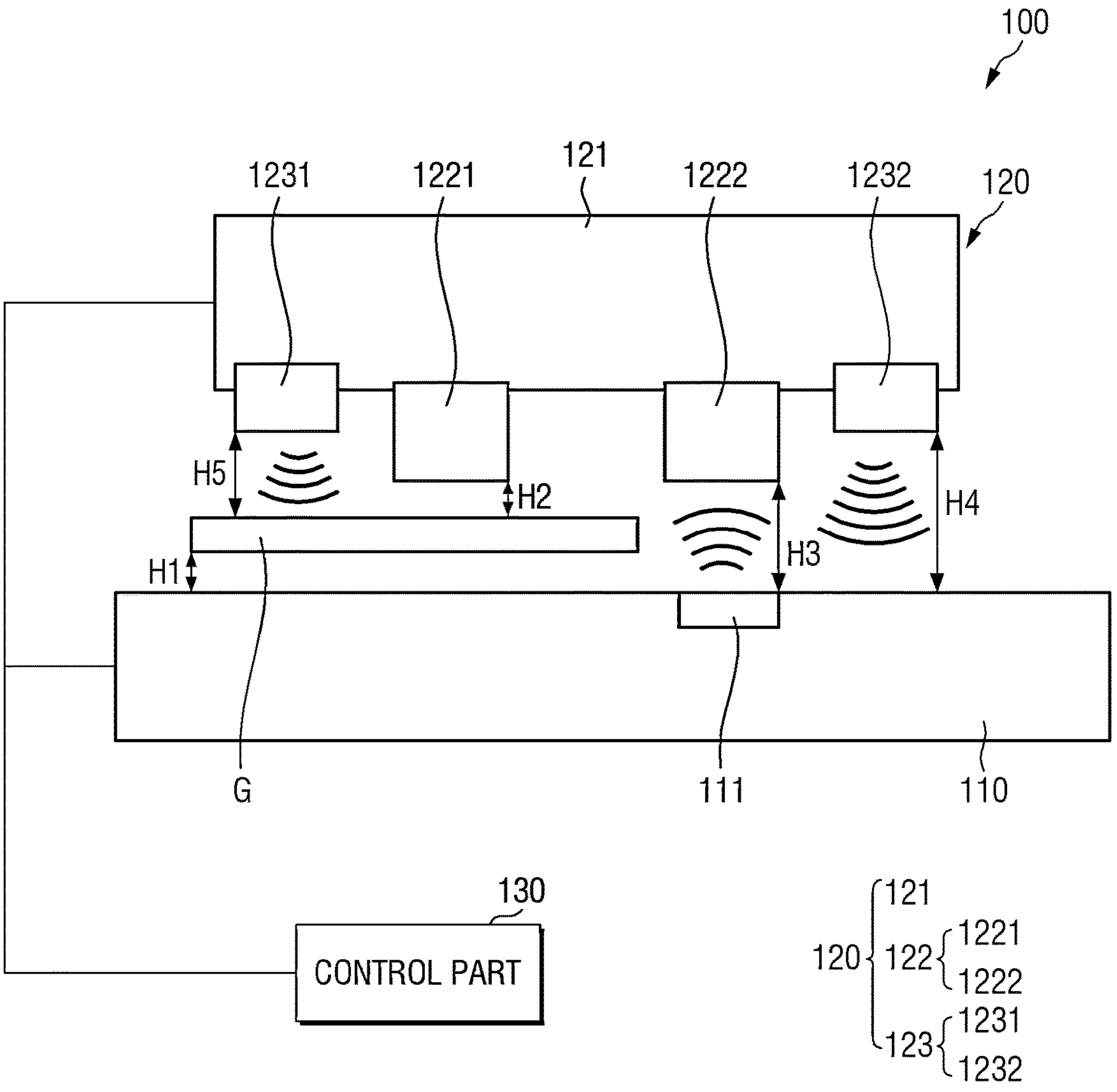

[FIG. 3]
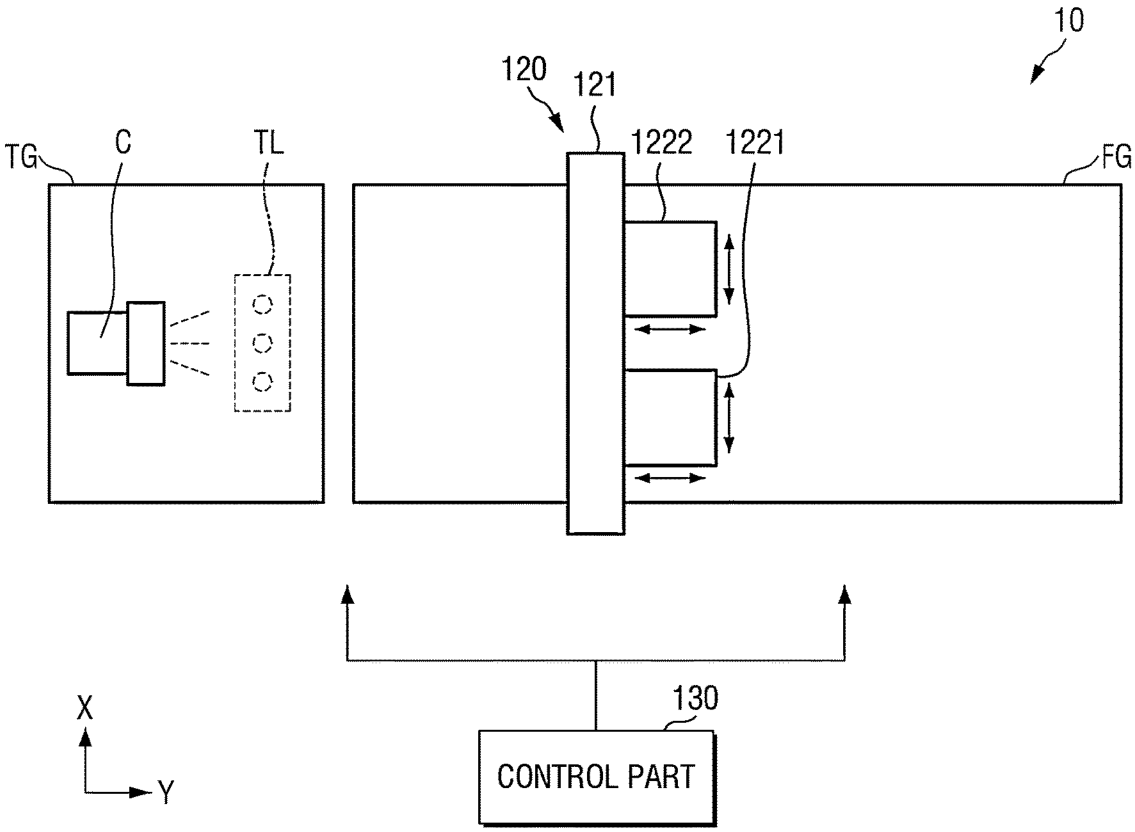

[FIG. 4]
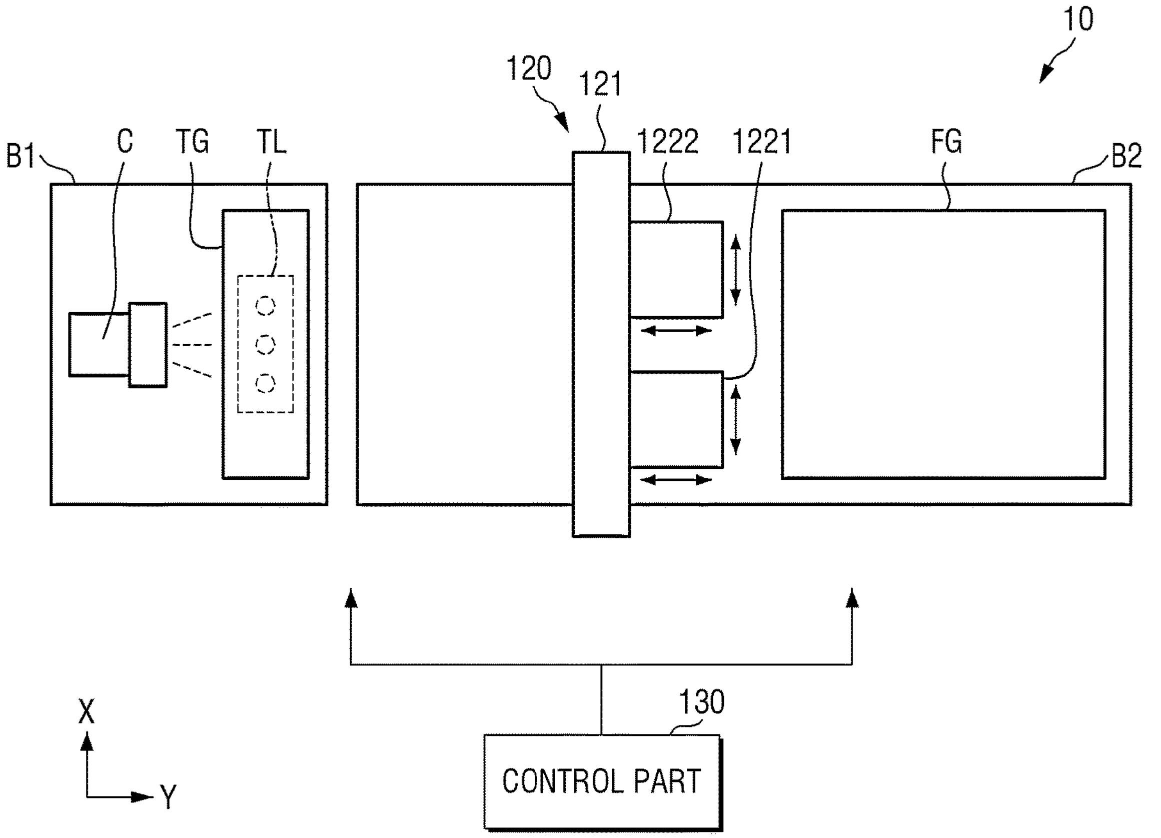

[FIG. 5]
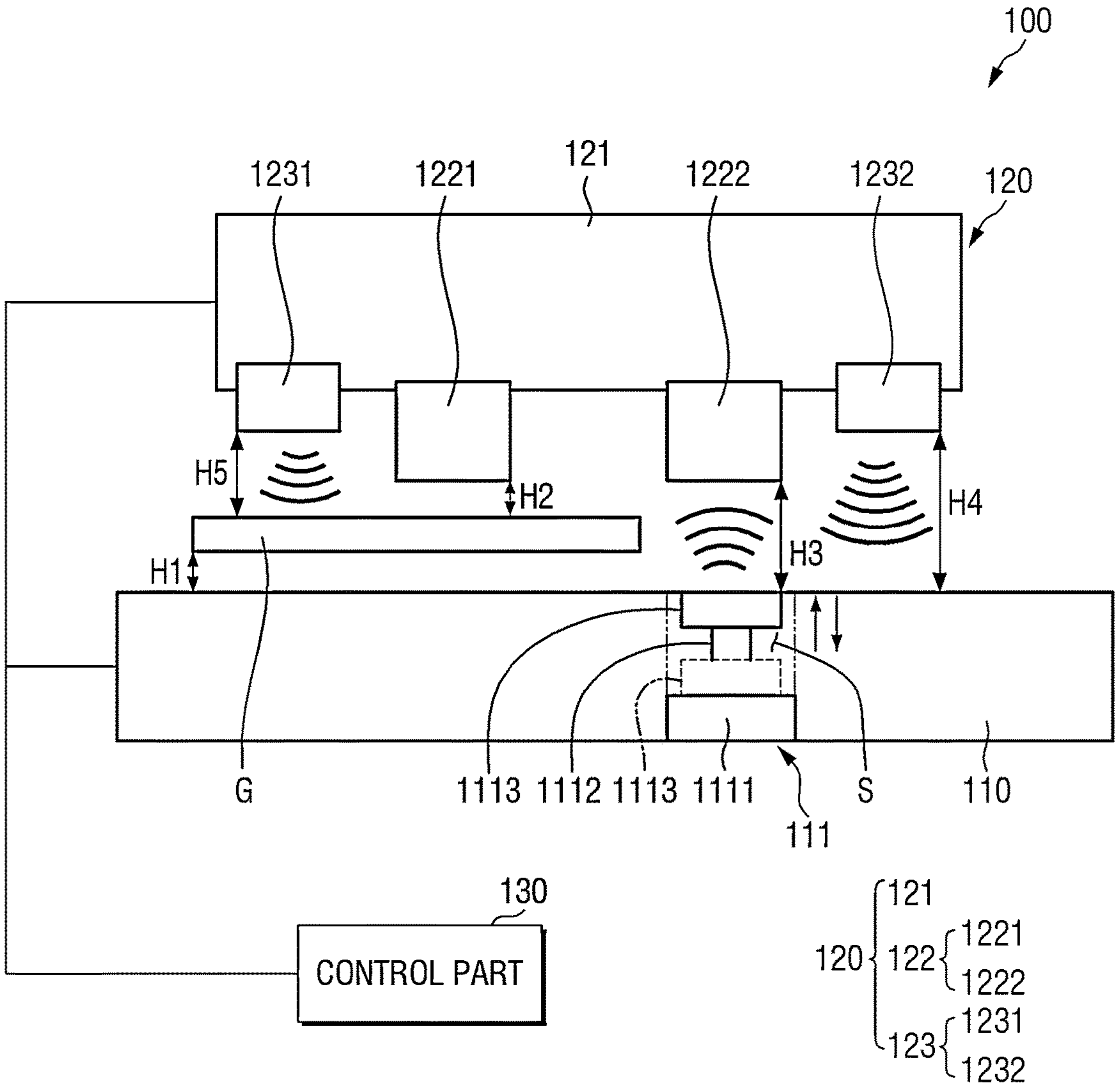

[FIG. 6]
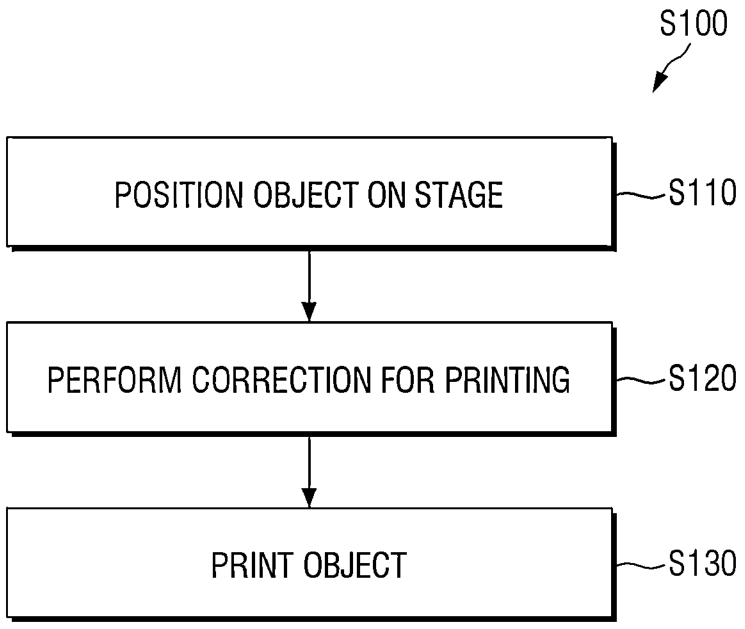

PRINTING APPARATUS AND PRINTING METHOD

This application claims priority from Korean Patent Application No. 10-2021-0084835 filed on Jun. 29, 2021 in the Korean Intellectual Property Office, and all the benefits accruing therefrom under 35 U.S.C. 119, the contents of which in its entirety are herein incorporated by reference.

BACKGROUND

1. Field of the Disclosure

The present disclosure relates to a printing apparatus and a printing method.

2. Description of the Related Art

A displacement sensor mounted on a head frame uses a sensor installed to measure the amount of floating of an object during the initial set-up of a facility and measures the amount of floating of the object with a one-time operation. In addition, in order to measure a distance between a printing means and the object, an operator should measure the distance using a measuring tool after entering the facility. Since this printing means frequently changes and uses teaching coordinates, the printing means may not perform a head maintenance operation in this process. In this process, there is a problem in that a scratch may occur on a head surface because the measuring tool physically measures between a head and a stage. In addition, a distance value between the printing means and the object varies depending on the state of the facility, so that there is a problem in that the impact reproducibility of the liquid discharged from the head deteriorates due to the characteristics of the printing means (e.g., inkjet method), thereby degrading printing quality. Therefore, there is a disadvantage in that the effective operation of the printing means is not easy.

SUMMARY

The present disclosure is directed to providing a printing apparatus, which may measure a distance between a printing unit, a printing object, and a mounting means on which the printing object is mounted in real time and correct the measured distance to adjust flatness of the printing unit in a printing process of the object, thereby improving printing quality.

In addition, the present disclosure is directed to providing a printing apparatus, which may organically measure position states between a sensor, a head part, etc. of a printing unit and an object, a mounting means, etc., thereby increasing an impact reproducibility of the discharged liquid discharged from the head part to the object.

In addition, the present disclosure is directed to providing a printing apparatus, which may omit the aging of related equipment in a process of handling a printing unit, a printing object, and a mounting means for securing an accurate printing and an impact reproducibility of discharged liquid, thereby increasing the efficiency and operability of the process.

The objects of the present disclosure are not limited to the aforementioned objects, and other objects not mentioned will be clearly understood by those skilled in the art from the following description.

A printing apparatus according to an aspect of the present disclosure includes: a stage on which an object is positioned; a printing unit provided above the stage and performing printing on the object; and a control part configured to perform a correction for printing on at least one of the object, the stage, and the printing unit based on preset printing conditions, wherein the printing unit may include a head frame provided above the stage, a detection sensor configured to detect a distance between the head frame and a part positioned thereunder, and a head part provided on the head frame to perform printing on the object.

A printing method according to another aspect of the present disclosure includes: positioning an object on a stage; and performing printing on the object by a printing unit provided above the stage, and further includes: performing a correction for printing on at least one of the object, the stage, and the printing unit based on preset printing conditions The printing unit may include a head frame provided above the stage, a detection sensor configured to detect a distance between the head frame and a part positioned thereunder, and a head part provided on the head frame to perform printing on the object.

In addition, the object may be floated on the stage, the stage may include a head part detection sensor configured to detect a distance to a stage-side head part, the head part may include an object-side head part positioned to face the object and the stage-side head part positioned to face the stage, and the printing conditions may include a first condition, which is a distance value between the object and the stage, a second condition, which is a distance value between the object-side head part and the object, and a third condition, which is a distance value between the stage-side head part and the stage, and a first derivation condition in which the second condition is derived to correspond to a difference between the third condition and the first condition.

In addition, the correction may include a first correction performing a measurement and position correction of the second condition based on the first derivation condition.

In addition, the detection sensor may include a stage detection sensor provided on a lower portion of the head frame and configured to detect a distance to the stage, and an object detection sensor provided on the lower portion of the head frame and configured to detect a distance to the object, the printing conditions may include a fourth condition, which is a distance value between the stage detection sensor and the stage and a fifth condition, which is a distance value between the object detection sensor and the object, and the object-side head part and the stage-side head part may include a second derivation condition in which a lower distance value, which is a distance with the object positioned thereunder, is derived based on at least one of the fourth condition and the fifth condition.

In addition, the correction may include a second correction correcting the lower distance value based on the second derivation condition in order to set the flatness of the printing unit.

In addition, the printing conditions may further include a real-time second condition in which the second condition is measured in real time, and the head part and the object may be maintained at a distance set therebetween based on the real-time second condition.

In addition, the printing conditions may further include a real-time fourth condition in which the fourth condition is measured in real time, and the head part and the object may be maintained at a distance set therebetween based on the real-time fourth condition.

In addition, the printing unit and the stage may be installed so that at least one of the printing unit and the stage is vertically movable and may be movable toward each other, and may be interlocked when at least the fourth condition among the printing conditions belongs to a preset range.

In addition, the stage may interrupt the floating of the object in response to the interlock when the fourth condition belongs to the preset range.

A printing apparatus and a printing method according to the present disclosure have one or more of the following effects.

The present disclosure can provide a printing apparatus, which may measure and correct the distance between a printing unit, a printing object, and a mounting means on which the printing object is mounted in real time in the printing process of the object, thereby adjusting the flatness of the printing unit and improving the printing quality.

In addition, the present disclosure may provide a printing apparatus, which may organically measure position states between a sensor, a head part, etc. of a printing unit and an object, and a mounting means, thereby increasing the impact reproducibility of the discharged liquid discharged from the head part to the object.

In addition, the present disclosure can provide a printing apparatus, which may omit the aging of the related equipment in a process of handling a printing unit, a printing object, a mounting means, etc. for securing the accurate printing and the impact reproducibility, thereby increasing the efficiency and operability of the process.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a diagram showing a printing apparatus according to an exemplary embodiment of the present disclosure;

FIG. 2 is a diagram showing an operating state of the printing apparatus of FIG. 1;

FIGS. 3 and 4 are diagrams showing examples of a printing process to which the printing apparatus of FIG. 1 is applied;

FIG. 5 is a diagram showing a printing apparatus according to another exemplary embodiment of the present disclosure; and FIG. 6 is a flowchart sequentially showing a printing method according to an exemplary embodiment of the present disclosure.

DETAILED DESCRIPTION OF THE EMBODIMENTS

Hereinafter, preferred exemplary embodiments of the present disclosure will be described in detail with reference to the accompanying drawings. Advantages and features of the present disclosure, and a method of achieving them will become apparent with reference to the exemplary embodiments described below in detail in conjunction with the accompanying drawings. However, the present disclosure is not limited to the exemplary embodiments described below but may be implemented in various different forms, and only these exemplary embodiments are provided to allow the disclosure of the present disclosure to be complete, and fully inform those skilled in the art to which the present disclosure pertains of the scope of the disclosure, and the present disclosure is only defined by the scope of the claims. The same reference numerals refer to the same components throughout the specification.

Spatially relative terms "below", "beneath", "lower", "above", "upper", etc. may be used to easily describe the correlation between an element or components and other elements or components as shown in the drawings. The spatially relative terms should be understood as terms including different directions of the element while using or operating in addition to the directions shown in the drawings. For example, when the element shown in the drawing is turned over, the element described as "below" or "beneath" another element may be placed "above" another element. Therefore, the exemplary term "below or beneath" may include both directions below and above. The element may also be oriented in other directions, and therefore, the spatially relative terms may be interpreted depending on the orientations.

It is natural that although first, second, etc. are used to describe various elements, components, and/or sections, these elements, components, and/or sections are not limited by these terms. These terms are only used to distinguish one element, component, or section from another element, component, or section. Therefore, it is natural that the first element, the first component, or the first section mentioned below may also be the second element, the second component, or the second section within the technical spirit of the present disclosure.

The terminology used in this specification is for the purpose of describing the exemplary embodiments and is not intended to limit the present disclosure. In this specification, the singular form also includes the plural form unless otherwise specified in the phrase. "Comprises" and/or "comprising" used in the specification do not preclude the presence or addition of one or more other components, steps, operations, and/or elements other than the stated component, step, operation, and/or element.

Unless otherwise defined, all terms (including technical and scientific terms) used in this specification may be used as the meaning commonly understood by those skilled in the art to which the present disclosure pertains. In addition, terms defined in a commonly used dictionary are not to be interpreted ideally or excessively unless clearly specifically defined.

Hereinafter, exemplary embodiments of the present disclosure will be described in detail with reference to the accompanying drawings, and in describing the present disclosure with reference to the accompanying drawings, the same reference numerals are given to the same or corresponding components regardless of the reference numerals and overlapped descriptions thereof will be omitted.

Referring to FIG. 1, a printing apparatus according to an exemplary embodiment of the present disclosure includes a stage 110, a printing unit 120, and a control part 130. Here, the stage 110 includes a head part detection sensor 111. The printing unit 120 includes a head frame 121, a head part 122, and a detection sensor 123.

Here, the head part 122 includes an object-side head part 1221 and a stage-side head part 1222. The detection sensor 123 includes a stage detection sensor 1232 and an object detection sensor 1231.

An object G is positioned on the stage 110. The printing unit 120 is provided above the stage 110 and performs printing on the object G. The control part 130 may operate so that the correction for printing is performed on at least one of the object G, the stage 110, and the printing unit 120 based on preset printing conditions.

Referring to FIG. 2, the head frame 121 of the printing unit 120 is provided above the stage 110. The detection sensor 123 of the printing unit 120 is provided on the head frame 121 to detect a distance between the head frame 121 and a part positioned thereunder.

The head part 122 of the printing unit 120 is provided on the head frame 121 to perform printing on the object G positioned on the stage 110. The object G is floated on the stage 110.

The head part detection sensor 111 of the stage 110 detects a distance to the stage-side head part 1222. The object-side head part 1221 of the head part 122 is positioned to face the object G. The stage-side head part 1222 of the head part 122 is positioned to face the stage 110.

Meanwhile, the printing conditions include first to fifth conditions, first and second derivation conditions, a real-time second condition, and a real-time fourth condition. The first condition includes a first distance value H1, which is a distance value between the object G and the stage 110.

The second condition includes a second distance value H2, which is a distance value between the object-side head part 1221 and the object G. The third condition includes a third distance value H3, which is a distance value between the stage-side head part 1222 and the stage 110.

In addition, the first derivation condition includes that the second condition is derived to correspond to a difference between the third condition and the first condition. The correction includes first and second corrections. The first correction includes performing a measurement and position correction of the second condition based on the first derivation condition among the printing conditions.

The stage detection sensor 1232 of the detection sensor 123 is provided on a lower portion of the head frame 121. The stage detection sensor 1232 serves to detect a distance to the stage 110.

The object detection sensor 1231 of the detection sensor 123 is provided on the lower portion of the head frame 121. The object detection sensor 1231 serves to detect a distance to the object G.

In addition, the fourth condition among the printing conditions may include a fourth distance value H4, which is a distance value between the stage detection sensor 1232 and the stage 110. The fifth condition may include a fifth distance value H5, which is a distance value between the object detection sensor 1231 and the object G.

The second derivation condition includes that a lower distance value, which is a distance between the head part 122 and the object positioned under the head part 122, is derived based on at least one of the fourth condition and the fifth condition.

Here, the second correction among the corrections includes that the lower distance value is corrected based on the second derivation condition in order to set the flatness of the printing unit 100.

The lower distance may be a distance corresponding to the fourth condition and the fifth condition. The flatness of the printing unit 100 or the head frame 121 may be adjusted by measuring the distance between the object detection sensor 1231 and the object G, the distance between the stage detection sensor 1232 and the stage 110, and a distance between each corner of the head frame 121 and the object G and the stage 110.

Therefore, it is possible to improve printing quality for the object G of the printing unit 100 and increase an impact reproducibility of liquid discharged from the head part. In addition, it is possible to omit or minimize the aging of all printing-related equipment, such as the impact of the liquid discharged from the head part 122, thereby operating the equipment more stably.

In addition, the real-time second condition among the printing conditions may include that the second condition is measured in real time. The head part 122 and the object G are maintained at a distance set therebetween based on the real-time second condition.

The real-time fourth condition among the printing conditions may include that the fourth condition is measured in real time. The head part 122 and the object G are maintained at a distance set therebetween based on the real-time fourth condition.

Here, the printing unit 120 and the stage 110 are installed so that at least one of the printing unit 120 and the stage 110 is vertically movable and thus are movable toward each other. The printing unit 120 and the stage 110 are interlocked when at least the fourth condition among the printing conditions belongs to a preset range.

When the fourth condition belongs to the preset range, the stage 110 may interrupt the floating of the object G in response to the interlock.

Referring to FIG. 3, in the printing apparatus, the object G may be provided as a test object TG and a real object FG for full-scale real printing. A test area TL serving as a discharge point of the liquid discharged from the printing unit 120 may be designated in the test object TG.

This is to check the impact of the liquid to the test area TL, and then perform the real printing. The head frame 121 of the printing unit 120 may be provided in a gantry form.

The head frame 121 moves over the real object FG. The positions of the object-side head part 1221 and the stage-side head part 1222 are moved by the head frame 121.

Each of the object-side head part 1221 and the stage-side head part 1222 moves in front and rear and left and right directions in a set range over the head frame 121 other than the movement of the head frame 121.

For the liquid discharged into the test area TL, all processes after the liquid is impacted to the test area TL from a time point when the liquid is discharged are captured by a capturing module C. Therefore, it is possible to monitor a state from the initial discharge of the liquid to after discharging is completed.

Referring to FIG. 4, in the printing apparatus, the test object TG may be provided in a state of being mounted on a predetermined first base part B1 unlike in FIG. 3. Likewise, the real object FG may also be provided in a state of being mounted on a predetermined second base part B2.

Referring to FIG. 5, the head part detection sensor 111 of the printing apparatus 100 includes a base driving part 1111 and a head part detection body 1113. Here, the base driving part 1111 is embedded in an internal space S on the stage 110 to provide a driving force.

The head part detection body 1113 is vertically moved from the base driving part 1111 through a connection part 1112. Here, the head part detection body 1113 is vertically adjusted in height depending on a printing environment.

For example, the printing environment includes an upper position of the stage-side head part 1222, a change in an output level for detecting the head part detection body 1113, etc.

Referring to FIG. 6, in a printing method (S100), an object G is positioned on a stage 110 in S110. In S120, the object G is printed by a printing unit 120 provided above the stage 110.

In S130, the correction for printing is performed on at least one of the object G, the stage 110, and the printing unit 120 based on preset printing conditions. This S130 may also be performed in an operation before S120.

Although the exemplary embodiments of the present disclosure have been described with reference to the above description and the accompanying drawings, those skilled in the art to which the present disclosure pertains will understand that the present disclosure may be carried out in other specific forms without changing the technical spirit or essential features thereof. Therefore, it should be understood that the aforementioned exemplary embodiments are illustrative in all respects and are not restrictive.

What is claimed is:

1. A printing apparatus comprising:

a stage on which an object is positioned;

a printing unit provided above the stage and performing printing on the object; and a control part configured to perform a correction for printing on at least one of the object, the stage, and the printing unit based on preset printing conditions, wherein the printing unit includes a head frame provided above the stage, a detection sensor configured to detect a distance between the head frame and a part positioned thereunder, and a head part provided on the head frame to perform printing on the object, wherein:

the object is floated on the stage, the stage includes a head part detection sensor configured to detect a distance to a stage-side head part, and the head part includes an object-side head part positioned to face the object and the stage-side head part positioned to face the stage.

2. The printing apparatus of claim 1, wherein the printing conditions include a first condition including a first distance value, which is a distance value between the object and the stage, a second condition including a second distance value, which is a distance value between the object-side head part and the object, a third condition including a third distance value, which is a distance value between the stage-side head part and the stage, and a first derivation condition in which the second condition is derived to correspond to a difference between the third condition and the first condition.

3. The printing apparatus of claim 2, wherein the correction includes a first correction performing a measurement and position correction of the second condition based on the first derivation condition.

4. The printing apparatus of claim 2, wherein the detection sensor includes a stage detection sensor provided on a lower portion of the head frame and configured to detect a distance to the stage, and an object detection sensor provided on the lower portion of the head frame and configured to detect a distance to the object, the printing conditions include a fourth condition including a fourth distance value, which is a distance value between the stage detection sensor and the stage, and a fifth condition including a fifth distance value, which is a distance value between the object detection sensor and the object, and the object-side head part and the stage-side head part include a second derivation condition in which a lower distance value, which is a distance with the object positioned thereunder, is derived based on at least one of the fourth condition and the fifth condition.

5. The printing apparatus of claim 4, wherein the correction includes a second correction correcting the lower distance value based on the second derivation condition in order to set the flatness of the printing unit.

6. The printing apparatus of claim 5, wherein the printing conditions further include a real-time second condition in which the second condition is measured in real time, and the head part and the object are maintained at a distance set therebetween based on the real-time second condition.

7. The printing apparatus of claim 4, wherein the printing conditions further include a real-time fourth condition in which the fourth condition is measured in real time, and the head part and the object are maintained at a distance set therebetween based on the real-time fourth condition.

8. The printing apparatus of claim 4, wherein the printing unit and the stage are installed so that at least one of the printing unit and the stage is vertically movable and are movable toward each other, and interlocked when at least the fourth condition among the printing conditions belongs to a preset range.

9. The printing apparatus of claim 8, wherein the stage interrupts the floating of the object in response to the interlock when the fourth condition belongs to the preset range.

10. A printing method comprising:

positioning an object on a stage; and performing printing on the object by a printing unit provided above the stage, and further comprising: performing a correction for printing on at least one of the object, the stage, and the printing unit based on preset printing conditions, wherein the printing unit includes a head frame provided above the stage, a detection sensor configured to detect a distance between the head frame and a part positioned thereunder, and a head part provided on the head frame to perform printing on the object, wherein:

the object is floated on the stage, the stage includes a head part detection sensor configured to detect a distance to a stage-side head part, and the head part includes an object-side head part positioned to face the object and the stage-side head part positioned to face the stage.

11. The printing method of claim 10, wherein the printing conditions include a first condition including a first distance value, which is a distance value between the object and the stage, a second condition including a second distance value, which is a distance value between the object-side head part and the object, a third condition including a third distance value, which is a distance value between the stage-side head part and the stage, and a first derivation condition in which the second condition is derived to correspond to a difference between the third condition and the first condition.

12. The printing method of claim 11, wherein the correction includes a first correction performing a measurement and position correction of the second condition based on the first derivation condition.

13. The printing method of claim 11, wherein the detection sensor includes a stage detection sensor provided on a lower portion of the head frame and configured to detect a distance to the stage, and an object detection sensor provided on the lower portion of the head frame and configured to detect a distance to the object, the printing conditions further include a fourth condition including a fourth distance value, which is a distance value between the stage detection sensor and the stage, and a fifth condition including a fifth distance value, which is a distance value between the object detection sensor and the object, and the object-side head part and the stage-side head part include a second derivation condition in which a lower distance value, which is a distance with the object positioned thereunder, is derived based on at least one of the fourth condition and the fifth condition.

14. The printing method of claim 13, wherein the correction includes a second correction correcting the lower distance value based on the second derivation condition in order to set the flatness of the printing unit.

15. A printing method comprising:

positioning an object on a stage; and performing printing on the object by a printing unit provided above the stage, and further comprising: performing a correction for printing on at least one of the object, the stage, and the printing unit based on preset printing conditions, wherein the printing unit includes a head frame provided above the stage, a detection sensor configured to detect a distance between the head frame and a part positioned thereunder, and a head part provided on the head frame to perform printing on the object, the object is floated on the stage, the stage includes a head part detection sensor configured to detect a distance to a stage-side head part, the head part includes an object-side head part positioned to face the object and the stage-side head part positioned to face the stage, the printing conditions include a first condition including a first distance value, which is a distance value between the object and the stage, a second condition including a second distance value, which is a distance value between the object-side head part and the object, a third condition including a third distance value, which is a distance value between the stage-side head part and the stage, and a first derivation condition in which the second condition is derived to correspond to a difference between the third condition and the first condition, the correction includes a first correction performing a measurement and position correction of the second condition based on the first derivation condition, the detection sensor includes a stage detection sensor provided on a lower portion of the head frame and configured to detect a distance to the stage and an object detection sensor provided on the lower portion of the head frame and configured to detect a distance to the object, the printing conditions include a fourth condition including a fourth distance value, which is a distance value between the stage detection sensor and the stage, and a fifth condition including a fifth distance value, which is a distance value between the object detection sensor and the object, the object-side head part and the stage-side head part include a second derivation condition in which a lower distance value, which is a distance with the object positioned thereunder, is derived based on at least one of the fourth condition and the fifth condition, the correction includes a second correction correcting the lower distance value based on the second derivation condition in order to set the flatness of the printing unit, the printing conditions further include a real-time fourth condition in which the fourth condition is measured in real time, the head part and the object are maintained at a distance set therebetween based on the real-time fourth condition, and the printing unit and the stage are installed so that at least one of the printing unit and the stage is vertically movable and are movable toward each other, and interlocked when at least the fourth condition among the printing conditions belongs to a preset range.

* * * * *